(12) United States Patent
Nakazawa et al.

(10) Patent No.: US 12,092,854 B2
(45) Date of Patent: Sep. 17, 2024

(54) FOLDABLE DISPLAY DEVICE

(71) Applicant: E Ink Holdings Inc., Hsinchu (TW)

(72) Inventors: Kenji Nakazawa, Hsinchu (TW);
Keisuke Hashimoto, Hsinchu (TW);
Deng-Kuen Shiau, Hsinchu (TW);
Chih-Chia Chen, Hsinchu (TW);
Yue-Feng Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/446,482

(22) Filed: Aug. 9, 2023

(65) Prior Publication Data

US 2024/0201431 A1   Jun. 20, 2024

(30) Foreign Application Priority Data

Dec. 15, 2022  (TW) ................................. 111148156

(51) Int. Cl.
*F21V 8/00* (2006.01)

(52) U.S. Cl.
CPC ......... *G02B 6/0046* (2013.01); *G02B 6/0036* (2013.01); *G02B 6/0068* (2013.01)

(58) Field of Classification Search
CPC ... G02B 6/0046; G02B 6/0036; G02B 6/0068
See application file for complete search history.

(56) References Cited

U.S. PATENT DOCUMENTS

| | | | |
|---|---|---|---|
| 10,488,887 B2 | 11/2019 | Yamazaki et al. | |
| 10,748,458 B2 | 8/2020 | Jeong et al. | |
| 10,863,619 B2 | 12/2020 | Lee et al. | |
| 11,086,363 B2 | 8/2021 | Su et al. | |
| 11,626,572 B2* | 4/2023 | Kim | H10K 71/00 257/40 |
| 2015/0185782 A1* | 7/2015 | Kim | G06F 1/1652 156/212 |
| 2019/0373719 A1 | 12/2019 | Lee et al. | |
| 2020/0103942 A1 | 4/2020 | Su et al. | |

(Continued)

FOREIGN PATENT DOCUMENTS

| CN | 106232323 A | 12/2016 |
|---|---|---|
| TW | 202107429 A | 2/2021 |

(Continued)

OTHER PUBLICATIONS

The office action of corresponding TW application No. 111148156 issued on Aug. 30, 2023.

*Primary Examiner* — Tsion Tumebo
(74) *Attorney, Agent, or Firm* — CKC & Partners Co., LLC (57) ABSTRACT

A foldable display device includes a reflective display panel, a light guiding layer and at least one light source. The light guiding layer is located on the reflective display panel and includes a non-foldable area, a foldable area and a transition area. The light guiding layer satisfies the following formulas: $D2<D1$, $W2 \geq R \times \pi$ and $J1 \leq (L-W2)/2 - W1$, in which D1 is a thickness of the non-foldable area, D2 is a thickness of the foldable area, W1 is a width of the non-foldable area, W2 is a width of the foldable area, R is a folding radius of the reflective display panel, J1 is a width of the transition area, L is a length of the light guiding layer. The light source is located on the reflective display panel and faces the sidewall of the light guiding layer.

15 Claims, 7 Drawing Sheets

(56) References Cited

U.S. PATENT DOCUMENTS

| | | | |
|---|---|---|---|
| 2020/0105169 A1 | 4/2020 | Jeong et al. | |
| 2020/0324521 A1* | 10/2020 | Park | B24B 7/24 |
| 2021/0027670 A1 | 1/2021 | Chou et al. | |
| 2021/0118334 A1 | 4/2021 | Kim | |
| 2021/0159434 A1 | 5/2021 | Hiroki et al. | |
| 2021/0280807 A1 | 9/2021 | Hiroki et al. | |
| 2021/0295749 A1 | 9/2021 | Hiroki et al. | |
| 2021/0405430 A1 | 12/2021 | Zhan et al. | |
| 2022/0107698 A1 | 4/2022 | Lee et al. | |

FOREIGN PATENT DOCUMENTS

| | | |
|---|---|---|
| TW | 202132878 A | 9/2021 |
| TW | 202203453 A | 1/2022 |
| TW | 202215132 A | 4/2022 |
| TW | 202218867 A | 5/2022 |

\* cited by examiner

FOLDABLE DISPLAY DEVICE

RELATED APPLICATIONS

This application claims priority to Taiwan Application Serial Number 111148156, filed Dec. 15, 2022, which is herein incorporated by reference.

BACKGROUND

Field of Disclosure

The present disclosure relates to a foldable display device.

Description of Related Art

The light guiding technology nowadays is sufficiently mature. Its applications are not only in backlight display devices, reflective display devices have a greater need for mature light guiding technology. However, owing to the rigidity of the material, light guiding technology is still restricted to planar display devices. If the light guiding technology further needs to be applied to a foldable devices, the thickness of the front light needs to be significantly smaller than the usual light guiding layer of the planar display device to lower the rigidity of the material and thus reach the purpose of being bendable. For example, when evaluating a reflective foldable device of 10 inches, at a condition of a folding radius of 4 mm, the thickness of the light guiding material needs to be at 0.1 mm to satisfy the condition. However, the thickness of the light guiding material is proportional to the efficiency of light emission. To have sufficient luminous flux, the light guiding material must have a sufficient thickness, or the amount or the power of the light source must be increased. As a result, however, the advantage of power-saving for the reflective display device is decreased. Therefore, the problem of designing the thickness of the light guiding material is crucial in the field.

SUMMARY

One aspect of the present disclosure provides a foldable display device.

According to one embodiment of the present disclosure, a foldable display device includes a reflective display panel, a light guiding layer and at least one light source. The light guiding layer is located on the reflective display panel and includes a non-foldable area, a foldable area and a transition area. The foldable area is located at a center portion of the light guiding layer. The transition area is located between the non-foldable area and the foldable area. The light guiding layer satisfies the following formulas: $D2<D1$, $W2 \geq R \times \pi$, and $J1 \leq (L-W2)/2 - W1$, in which D1 is a thickness of the non-foldable area, D2 is a thickness of the foldable area, W1 is a width of the non-foldable area, W2 is a width of the foldable area, R is a folding radius of the reflective display panel, J1 is a width of the transition area, and L is a length of the light guiding layer. The light source is located on the reflective display panel and faces a sidewall of the non-foldable area, configured to emit a light beam to the light guiding layer.

In some embodiments of the present disclosure, $W1=0$, and a continuous surface defined by the foldable area and the transition area is a falling wedge shape.

In some embodiments of the present disclosure, $J1<W1$, and a continuous surface defined by the foldable area and the transition area is a concave shape.

In some embodiments of the present disclosure, $J1=0$, a continuous surface defined by the non-foldable area and the transition area is a stepped shape.

In some embodiments of the present disclosure, the light guiding layer further includes a plurality of microstructures located on the top surface or the bottom surface of the light guiding layer, configured to interfere or destruct the total internal reflection of the light beam after entering the light guiding layer.

In some embodiments of the present disclosure, the microstructures include at least one of a hot pressing wedge micro array pattern, a spray printing micro array pattern, a non-uniform haze controlling particle and a non-uniform diffusion particle.

In some embodiments of the present disclosure, an amount of the light sources is two, and the two light sources faces two opposite sidewalls of the light guiding layer respectively.

In some embodiments of the present disclosure, the transition area is configured to transfer the light beam to the foldable area through the total internal reflection of the light beam.

One aspect of the present disclosure provides a foldable display device.

According to one embodiment of the present disclosure, a foldable display device includes a reflective display panel and a light guiding layer. The light guiding layer is located on the reflective display panel, in which the light guiding layer includes a plurality of microstructures configured to interfere or destruct the total internal reflection of a light beam in the light guiding layer. The light guiding layer further includes a non-foldable area, a foldable area and a transition area. The foldable area is located at a center portion of the light guiding layer. The transition area is located between the non-foldable area and the foldable area. The light guiding layer satisfies the following formulas: $D2<D1$, $W2 \geq R \times \pi$, and $J1 \leq (L-W2)/2 - W1$, in which D1 is a thickness of the non-foldable area, D2 is a thickness of the foldable area, W1 is a width of the non-foldable area, W2 is a width of the foldable area, J1 is a width of the transition area, R is a folding radius of the reflective display panel, and L is a length of the light guiding layer.

In some embodiments of the present disclosure, $W1=0$, and a continuous surface defined by the foldable area and the transition area is a falling wedge shape.

In some embodiments of the present disclosure, $J1<W1$, and a continuous surface defined by the foldable area and the transition area is a concave shape.

In some embodiments of the present disclosure, $J1=0$, a continuous surface defined by the non-foldable area and the transition area is a stepped shape.

In some embodiments of the present disclosure, a thickness of the transition area gradually decreases from the non-foldable area to the foldable area.

In some embodiments of the present disclosure, a top surface of the transition area has a first portion and a second portion adjacent to the non-foldable area and the foldable area respectively, and the first portion of the top surface are higher than the second portion.

In some embodiments of the present disclosure, the microstructures comprises at least one of a hot pressing wedge micro array pattern, a spray printing micro array pattern, a non-uniform haze controlling particle and a non-uniform diffusion particle.

In the aforementioned embodiments of the present disclosure, since the light guiding layer includes a non-foldable area, a foldable area and a transition area, and the thickness of the non-foldable area is greater than the thickness of the foldable area, which can ensure that the light guiding layer has sufficient amount of incident light. Moreover, since the thickness of the foldable area of the light guiding layer is small, the rigidity of the material of the foldable area is reduced, such that the foldable display device can be folded at the position of the foldable area. The thickness of the transition area of the light guiding layer is between the thickness of the foldable area and the thickness of the non-foldable area, such that it can transfer the light beam in the light guiding layer to the foldable area through the total internal reflection of the light beam. Under the condition of not adding the amount of the light source, both the amount of the incident light is sufficient and the foldable display device has a better power-saving effect.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the drawings. The spatially relative terms are intended to encompass different orientations of the device in use or operation in addition to the orientation depicted in the drawings. The apparatus may be otherwise oriented (rotated 90 degrees or at other orientations) and the spatially relative descriptors used herein may likewise be interpreted accordingly.

Figure 1:
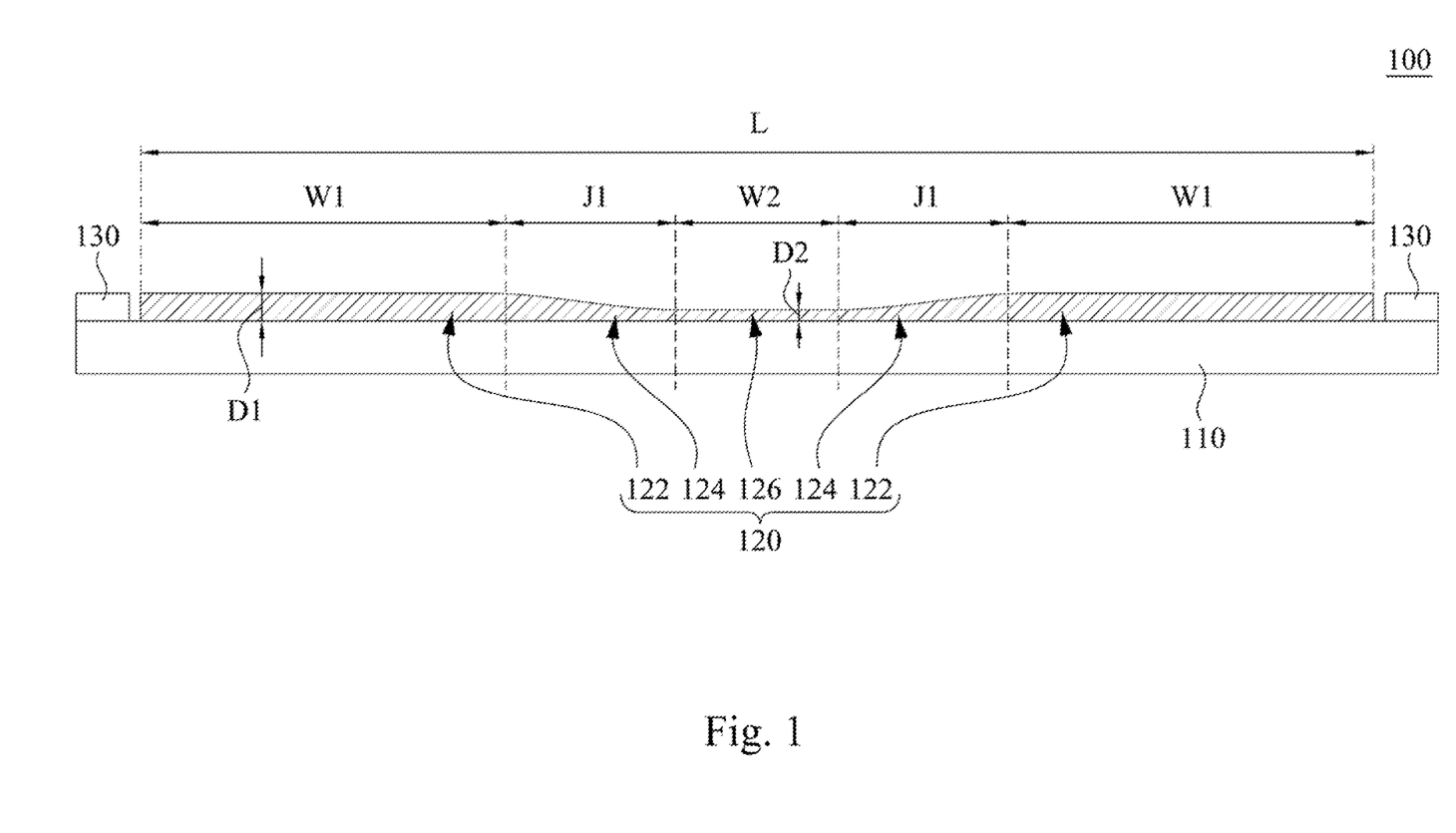
FIG. 1 is a cross-sectional view of a foldable display device according to one embodiment of the present disclosure.
Figure 2:
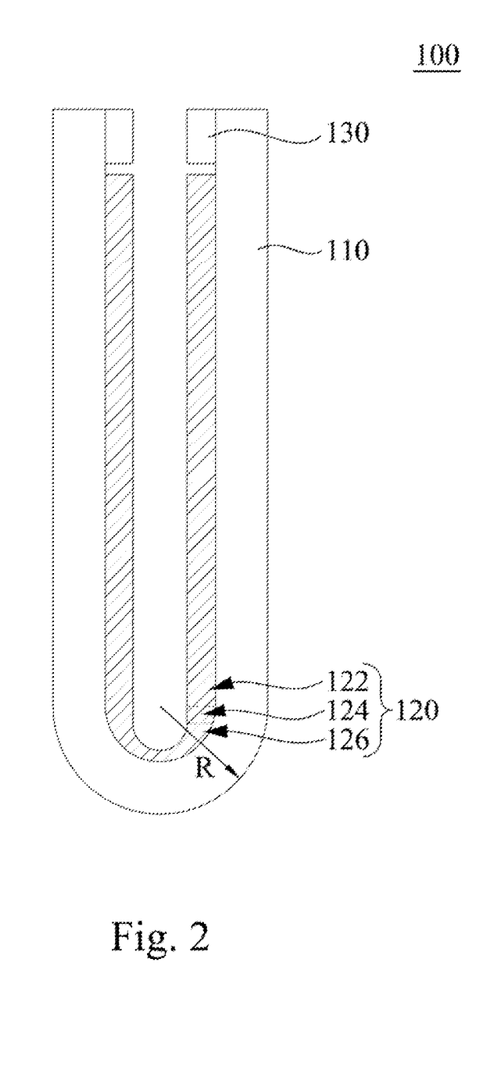
FIG. 2 is a cross-sectional view of the foldable display device of FIG. 1 when folded.

FIG. 1 is a cross-sectional view of a foldable display device 100 according to one embodiment of the present disclosure. FIG. 2 is a cross-sectional view of the foldable display device 100 of FIG. 1 when folded. Refer to FIG. 1 and FIG. 2, a foldable display device 100 includes a reflective display panel 110, a light guiding layer 120 and at least one light source 130. The light guiding layer 120 is located on the reflective display panel 110 and includes a non-foldable area 122, a foldable area 126 and a transition area 124. The foldable area 126 is located at a center portion of the light guiding layer 120. The transition area 124 is located between the non-foldable area 122 and the foldable area 124. Moreover, the light guiding layer satisfies the following formulas: $D2<D1$, $W2 \geq R \times \pi$, and $J1 \leq (L-W2)/2-W1$, in which D1 is a thickness of the non-foldable area 122, D2 is a thickness of the foldable area 126, W1 is a width of the non-foldable area 122, W2 is a width of the foldable area 126, J1 is a width of the transition area 124, R is a folding radius of the reflective display panel 110, and L is a length of the light guiding layer 120. As shown in FIG. 2, the folding radius R of the reflective display panel 110 means the outer radius of the reflective display panel 110 when the foldable display device 100 is folded. The light source 130 is located on the reflective display panel 110 and faces a sidewall of the non-foldable area 122, configured to emit a light beam to the light guiding layer 120.

The light guiding layer 120 of the foldable display device 100 satisfies the three formulas mentioned above. The first formula, $D2<D1$, means that the thickness D1 of the non-foldable area is greater than the thickness D2 of the foldable area. As a result, the rigidity of the foldable area 126 will be reduced, such that the foldable display device 100 with the light guiding layer 120 can be folded as shown in FIG. 2. The second formula, $W2 \geq R \times \pi$, means that the width W2 of the foldable area 126 of the light guiding layer 120 is greater or equal to the length of the reflective display panel 110 that will be folded under the foldable area 126, which is the folding radius R times pi. As shown in FIG. 2, when the foldable display device 100 is folded to its limit, the folding area of the reflective display panel 110 is a semicircular arc, which means that the folding area of the reflective display panel 110 is the product of the folding radius R and pi (which is half of the circumference). The width W2 of the foldable area 126 of the light guiding layer 120 should be greater or equal to this length to ensure the width W2 of the foldable area 126 which has a low rigidity is sufficient to let the foldable display device 100 be folded. The width J1 of the transition area 124 can be described as the third formula, $J1 \leq (L-W2)/2-W1$, which means that the width J1 of the transition area 124 can be smaller or equal to the value that half of the value that the length L of the light guiding layer 120 minus the width W2 of the foldable area 126 minus the width W1 of the non-foldable area 122. This formula means that the light guiding layer 120 includes the non-foldable area 122, the transition area 124 and the foldable area 126, but other area can also be included.

In particular, since the light guiding layer 120 includes a non-foldable area 122, a foldable area 126 and a transition area 124, and the thickness D1 of the non-foldable area 122 is greater than the thickness D2 of the foldable area 126, which can ensure that the light guiding layer 120 has sufficient amount of incident light. Moreover, since the thickness D2 of the foldable area 126 of the light guiding layer 120 is small, the rigidity of the material of the foldable area 126 is reduced, such that the foldable display device 100 can be folded at the position of the foldable area 126. The thickness of the transition area 124 of the light guiding layer 120 is between the thickness D2 of the foldable area 126 and the thickness D1 of the non-foldable area 122, such that it can transfer the light beam in the light guiding layer 120 to the foldable area 126 through the total internal reflection of the light beam. Under the condition of not adding the amount of the light source 130, both the amount of the incident light is sufficient and the foldable display device 100 has a better power-saving effect.

In some embodiments, the number of the light source 130 can be plural, such as two, and the two light sources 130 faces the two opposite sidewalls of the light guiding layer 120 respectively, and is configured to emit a light beam to the light guiding layer 120. In other words, the light guiding layer can be located between the two light sources 130. The thickness D2 of the non-foldable area 122 can be equal to the thickness of the emitting surface of the light source 130, to help the design of smoothen the peripheral portion of the foldable display device 100, but the disclosure is not limited to this. In other embodiments, the thickness D2 of the non-foldable area 122 can also be greater or smaller than the thickness of the emitting surface of the light source 130. The transition area 124 is configured to transfer the light beam emitted by the light source through the total internal reflection to the foldable area 126. In the present embodiment, the thickness of the transition area 124 gradually decreases from the non-foldable area to the foldable area. As a result of such a design, the non-foldable area with larger incident surface can receive the light beam from the light source 130, and transfer the light beam to the foldable area 126 through the transition area 124. The non-foldable area 122 has a sufficiently large incident surface to ensure a good luminous flux, and the foldable area 126 with low rigidity can let the foldable display device 100 be folded to the position of the foldable area 126. The transition area 124 can ensure that the light beam enters the light guiding layer 120 is transferred to the foldable area 126, such that all areas has a high luminous flux.

Figure 3A:
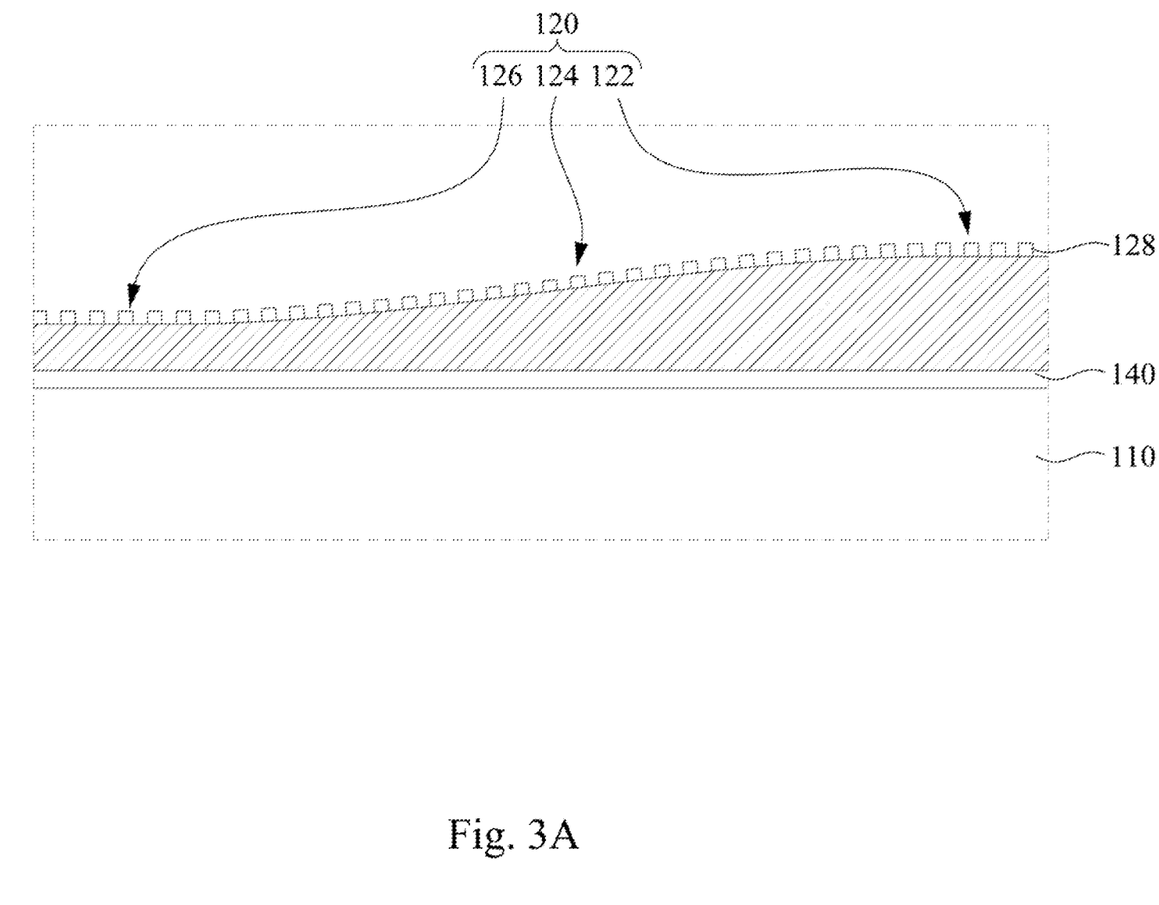
FIG. 3A is an enlarged view of the light guiding layer of the foldable display device of FIG. 1.

FIG. 3A is an enlarged view of the light guiding layer 120 of the foldable display device 100 of FIG. 1. Refer to FIG. 3A, the light guiding layer further includes a plurality of microstructures 128. In the present embodiment, the microstructures 128 are located on the top surface of the light guiding layer 120, configured to interfere or destruct the total internal reflection of the light beam after entering the light guiding layer 120. The microstructures 128 includes at least one of a hot pressing wedge micro array pattern, a spray printing micro array pattern, a non-uniform haze controlling particle and a non-uniform diffusion particle, but other methods can also be used to manufacture the microstructures. As shown in FIG. 3A, the light guiding layer 120 can be attached to the reflective display panel 110 by a layer of optical clear adhesive (OCA) 140. The microstructures 128 is all over on the light guiding layer 120, and can be on the non-foldable area 122, the transition area 124 and the foldable area 126. The microstructures 128 can interfere or destruct the total internal reflection of the light beam entering the light guiding layer 120, such that the light can be transferred to the destination.

Figure 3B:
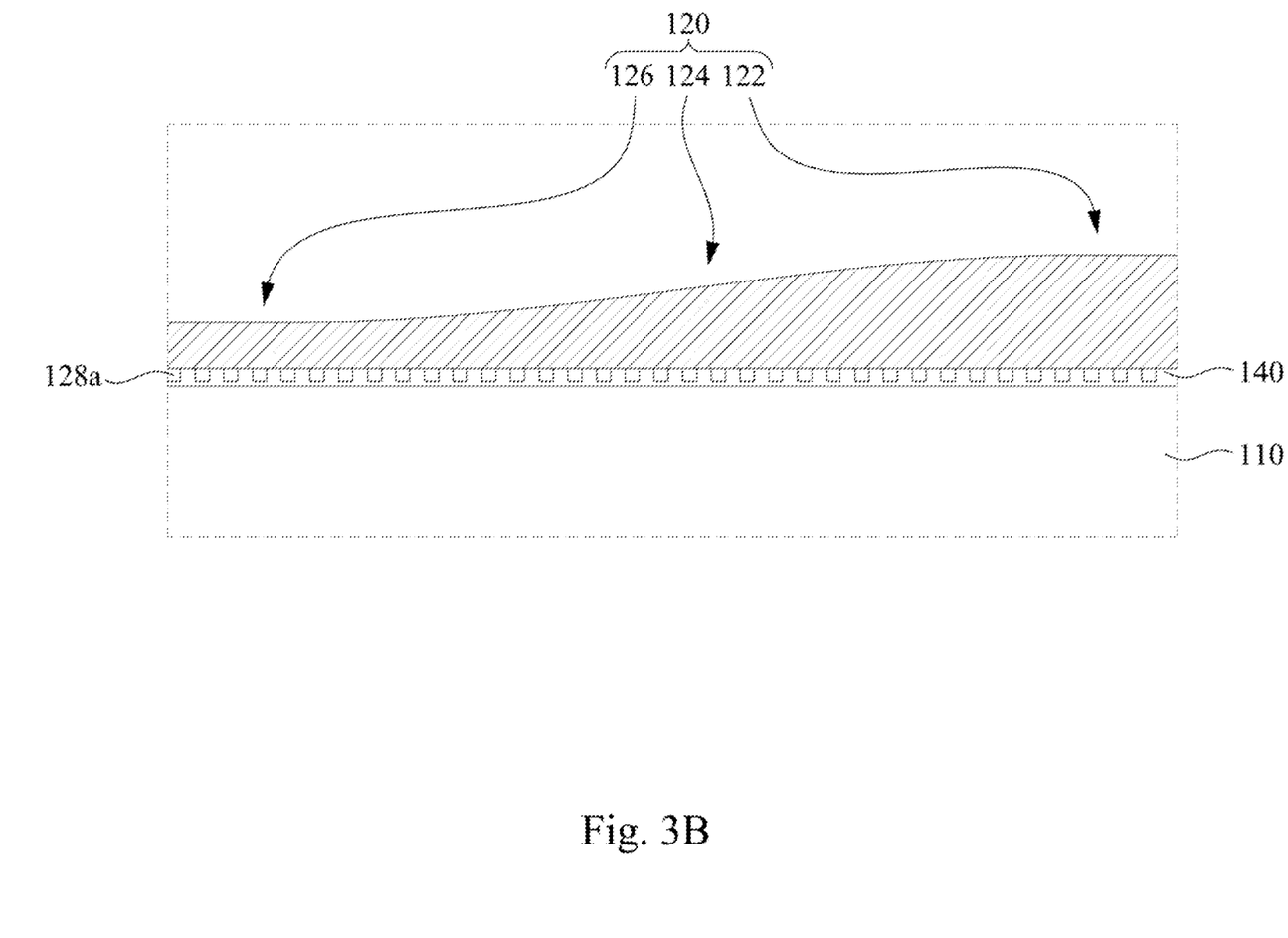
FIG. 3B is an enlarged view of the light guiding layer according to another embodiment of the present disclosure.

FIG. 3B is an enlarged view of the light guiding layer according to another embodiment of the present disclosure. The difference between the present embodiment and the embodiment shown in FIG. 3A is that the microstructures 128a of FIG. 3B is located on the bottom surface of the light guiding layer 120. The microstructures 128a includes at least one of a hot pressing wedge micro array pattern, a spray printing micro array pattern, a non-uniform haze controlling particle and a non-uniform diffusion particle, but other methods can also be used to manufacture the microstructures. Moreover, the microstructures 128a located on the bottom surface of the light guiding layer 120 can be located in the optical clear adhesive 140.

The microstructures 128 of FIG. 3A and the microstructures 128a of FIG. 3B can be optionally applied in the embodiments of FIG. 1, FIG. 4, FIG. 5 and FIG. 6.

Figure 4:
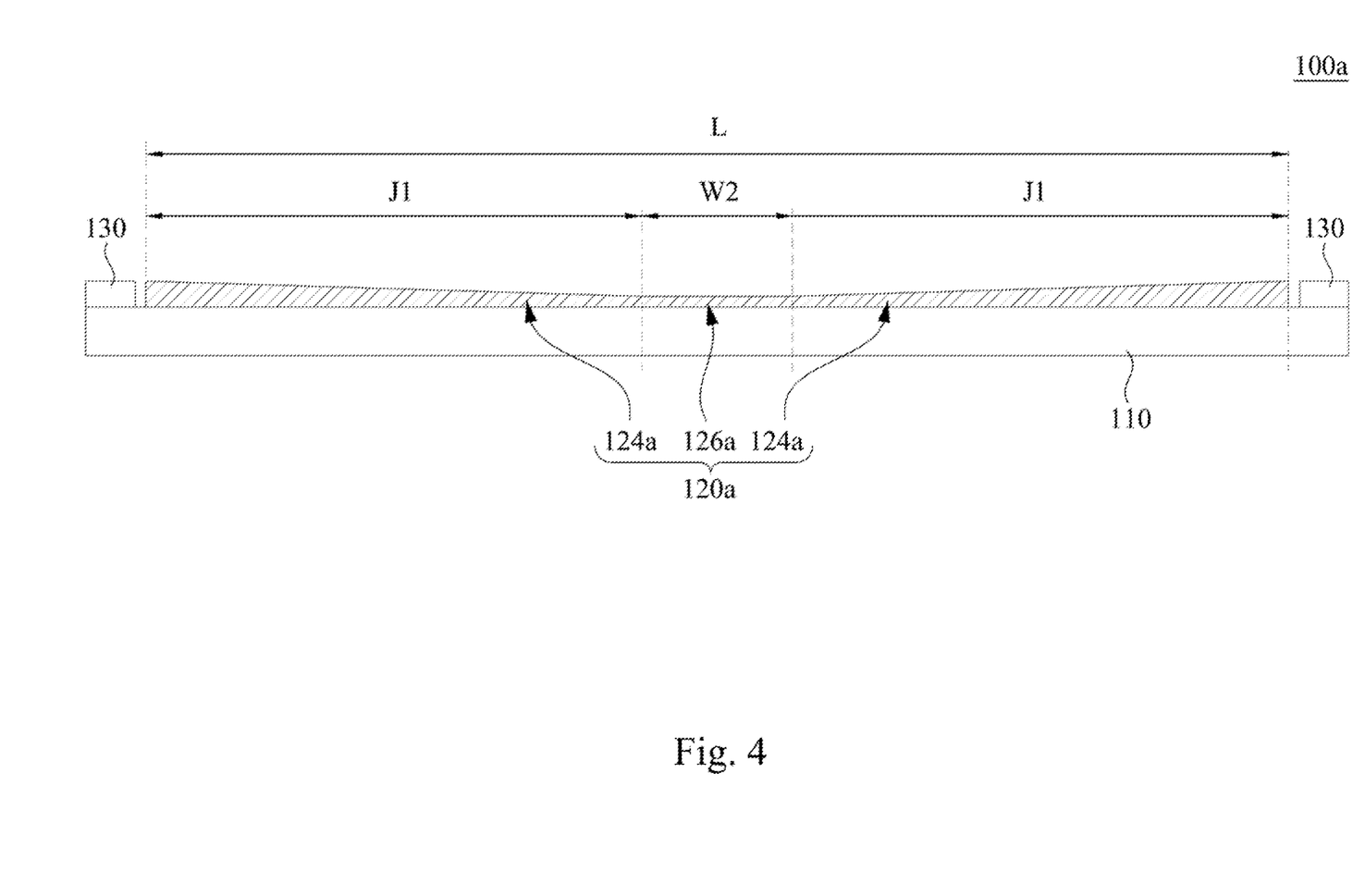
FIG. 4 is a cross-sectional view of a foldable display device according to another embodiment of the present disclosure.

FIG. 4 is a cross-sectional view of a foldable display device 100a according to another embodiment of the present disclosure. A foldable display device 100a includes a reflective display panel 110, a light guiding layer 120a and at least one light source 130. In the present embodiment, the light guiding layer 120a of the foldable display device 100a has no non-foldable area 122 as in FIG. 1, which means that the width W1 of the non-foldable area of the light guiding layer 120a is zero. Moreover, the continuous surface defined by the foldable area 126a and the transition area 124a is a falling wedge shape. In the present embodiment, the sidewall of the transition area 124a can directly absorb the light beam emitted by the light source 130, and transfer the light beam emitted by the light source 130 to the foldable area 126a, and thus can achieve a similar efficacy as the embodiment mentioned above.

Figure 5:
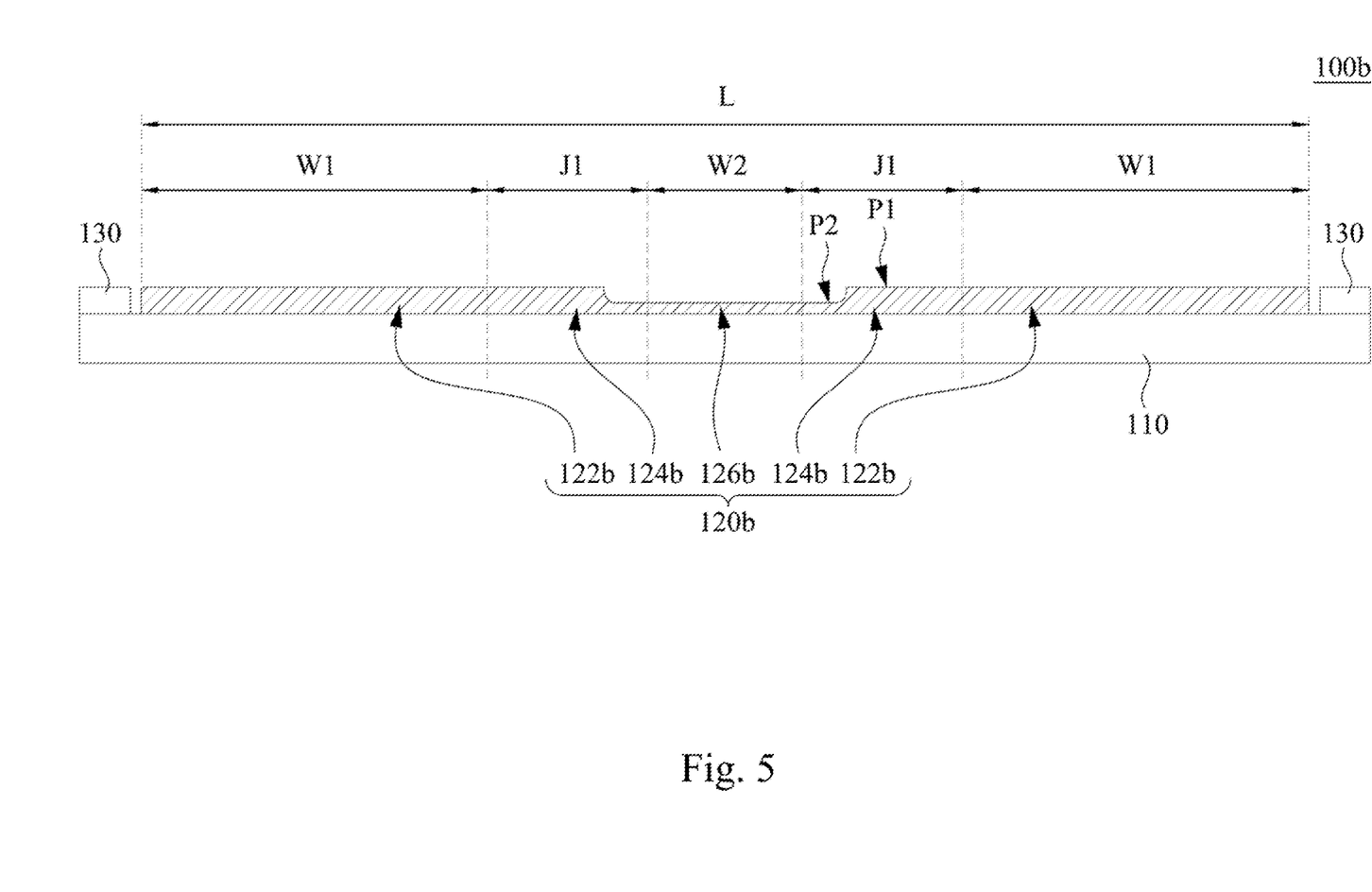
FIG. 5 is a cross-sectional view of a foldable display device according to yet another embodiment of the present disclosure.

FIG. 5 is a cross-sectional view of a foldable display device 100b according to yet another embodiment of the present disclosure. A foldable display device 100b includes a reflective display panel 110, a light guiding layer 120b and at least one light source 130. In the present embodiment, the width W1 of the non-foldable area 122b is greater than the width J1 of the transition area, i.e. W1>J1, and the continuous surface defined by the foldable area 126b and the transition area 124b is a concave shape. The top surface of the transition area has a first portion P1 and a second portion P2 adjacent to the non-foldable area 122b and the foldable area 126b respectively, and the first portion P1 of the top surface is higher than the second portion P2.

Figure 6:
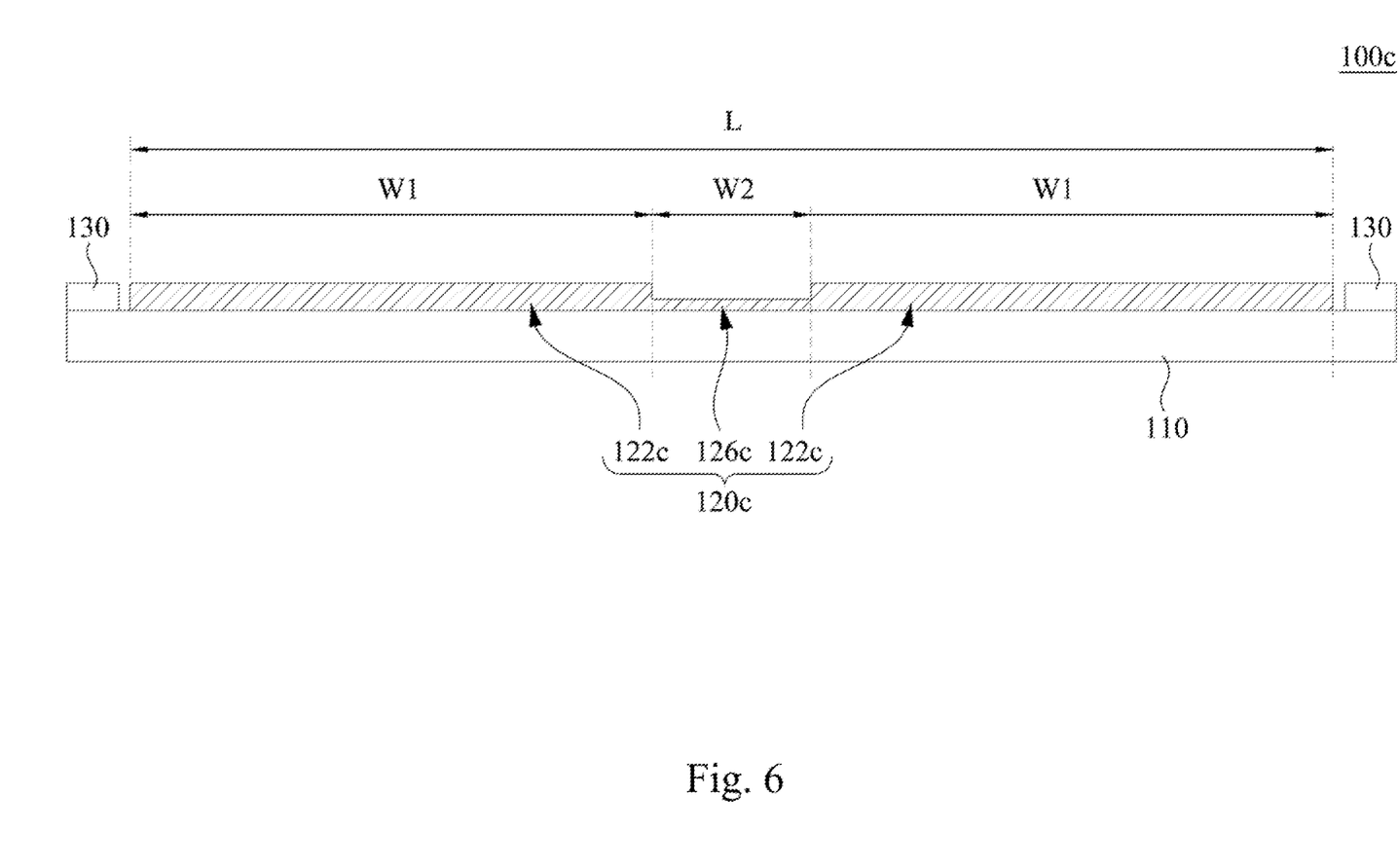
FIG. 6 is a cross-sectional view of a foldable display device according to yet another embodiment of the present disclosure.

FIG. 6 is a cross-sectional view of a foldable display device 100c according to yet another embodiment of the present disclosure. A foldable display device 100c includes a reflective display panel 110, a light guiding layer 120c and at least one light source 130. In the present embodiment, the light guiding layer 120c of the foldable display device 100c has no transition area 124 as in FIG. 1, which means that the width J1 of the transition area of the light guiding layer 120c is zero. Moreover, the continuous surface defined by the foldable area 126c and the non-foldable area 122c is a stepped shape. In other words, there is no surface with a gradient-changed thickness between the foldable area 126c and the non-foldable area 122c of the foldable display device 100c. A similar efficacy to other embodiments can be achieved through the stepped-shaped surface of the light guiding layer 120b.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A foldable display device, comprising:
   a reflective display panel;
   a light guiding layer located on the reflective display panel, comprising:
      a non-foldable area;
      a foldable area located at a center portion of the light guiding layer; and
      a transition area located between the non-foldable area and the foldable area, the light guiding layer satisfies the following formulas:
      $D2<D1$, $W2 \geq R \times \pi$, and $J1 \leq (L-W2)/2 - W1$, wherein D1 is a thickness of the non-foldable area, D2 is a thickness of the foldable area, W1 is a width of the non-foldable area, W2 is a width of the foldable area, R is a folding radius of the reflective display panel, J1 is a width of the transition area, and L is a length of the light guiding layer; and
   at least one light source located on the reflective display panel and faces a sidewall of the non-foldable area, configured to emit a light beam to the light guiding layer.

2. The foldable display device of claim 1, wherein $W1=0$, and a continuous surface defined by the foldable area and the transition area is a falling wedge shape.

3. The foldable display device of claim 1, wherein $J1<W1$, and a continuous surface defined by the foldable area and the transition area is a concave shape.

4. The foldable display device of claim 1, wherein $J1=0$, a continuous surface defined by the non-foldable area and the transition area is a stepped shape.

5. The foldable display device of claim 1, wherein the light guiding layer further comprising:
   a plurality of microstructures located on a top surface or a bottom surface of the light guiding layer, configured to interfere or destruct a total internal reflection of the light beam after entering the light guiding layer.

6. The foldable display device of claim 5, wherein the microstructures comprises at least one of a hot pressing wedge micro array pattern, a spray printing micro array pattern, a non-uniform haze controlling particle and a non-uniform diffusion particle.

7. The foldable display device of claim 1, wherein an amount of the light sources is two, and the two light sources faces two opposite sidewalls of the light guiding layer respectively.

8. The foldable display device of claim 1, wherein the transition area is configured to transfer the light beam to the foldable area through a total internal reflection of the light beam.

9. A foldable display device, comprising:
   a reflective display panel; and
   a light guiding layer located on the reflective display panel, wherein the light guiding layer comprises a plurality of microstructures configured to interfere or destruct a total internal reflection of a light beam in the light guiding layer, the light guiding layer further comprising:
      a non-foldable area;
      a foldable area located at a center portion of the light guiding layer; and
      a transition area located between the non-foldable area and the foldable area, the light guiding layer satisfies the following formulas:
      $D2<D1$, $W2 \geq R \times \pi$, and $J1 \leq (L-W2)/2 - W1$, wherein D1 is a thickness of the non-foldable area, D2 is a thickness of the foldable area, W1 is a width of the non-foldable area, W2 is a width of the foldable area, R is a folding radius of the reflective display panel, J1 is a width of the transition area, and L is a length of the light guiding layer.

10. The foldable display device of claim 9, wherein $W1=0$, and a continuous surface defined by the foldable area and the transition area is a falling wedge shape.

11. The foldable display device of claim 9, wherein $J1<W1$, and a continuous surface defined by the foldable area and the transition area is a concave shape.

12. The foldable display device of claim 9, wherein $J1=0$, a continuous surface defined by the non-foldable area and the transition area is a stepped shape.

13. The foldable display device of claim 9, wherein a thickness of the transition area gradually decreases from the non-foldable area to the foldable area.

14. The foldable display device of claim 9, wherein a top surface of the transition area has a first portion and a second portion adjacent to the non-foldable area and the foldable area respectively, and the first portion of the top surface are higher than the second portion.

15. The foldable display device of claim 9, wherein the microstructures comprises at least one of a hot pressing wedge micro array pattern, a spray printing micro array pattern, a non-uniform haze controlling particle and a non-uniform diffusion particle.

* * * * *